United States Patent
Chen

(10) Patent No.: US 7,870,983 B2
(45) Date of Patent: Jan. 18, 2011

(54) TISSUE BOX HOLDER WITH MAGNETIC AND HOOK AND LOOP ATTACHING ARRANGEMENTS

(76) Inventor: Cheng-Lung Chen, 92, Chungzao Road, SEC 2, Hemei, Chunghua (TW)

( * ) Notice: Subject to any disclaimer, the term of this patent is extended or adjusted under 35 U.S.C. 154(b) by 451 days.

(21) Appl. No.: 12/111,947

(22) Filed: Apr. 29, 2008

(65) Prior Publication Data

US 2008/0277440 A1    Nov. 13, 2008

(30) Foreign Application Priority Data

May 11, 2007    (TW) ................................ 96207594 U

(51) Int. Cl.
*B60R 7/04* (2006.01)

(52) U.S. Cl. ........................ 224/275; 224/546; 224/562; 224/572

(58) Field of Classification Search ................. 224/255, 224/275, 572, 546, 901.4, 183, 562
See application file for complete search history.

(56) References Cited

U.S. PATENT DOCUMENTS

| | | | | |
|---|---|---|---|---|
| 2,887,216 A | * | 5/1959 | Hargraves | .................... 224/277 |
| 2,991,036 A | * | 7/1961 | Morgan et al. | ........... 248/206.5 |
| 3,172,584 A | * | 3/1965 | Cohen | ......................... 224/547 |
| 3,284,041 A | * | 11/1966 | Tjaden | ..................... 248/311.3 |
| 3,642,122 A | * | 2/1972 | Von Ende | .................... 224/562 |
| 3,685,777 A | * | 8/1972 | Dema | ....................... 248/205.1 |
| 4,176,817 A | * | 12/1979 | Jones | .......................... 248/313 |
| D276,389 S | * | 11/1984 | Fellhoelter | ................... D6/552 |
| 5,065,970 A | * | 11/1991 | Gross | ....................... 248/311.2 |
| 5,398,856 A | * | 3/1995 | Shyu | .......................... 224/277 |
| 5,573,216 A | * | 11/1996 | Kuroda | ..................... 248/316.7 |
| 5,823,497 A | * | 10/1998 | Weatherhead | ............ 248/316.7 |

\* cited by examiner

*Primary Examiner*—Justin M Larson

(57) ABSTRACT

A facial tissue box holder for automobile includes two supports comprising a rectangular main section having slits at both ends, a rectangular side section hingedly secured to the main section, an engagement section pivotably secured to the side section, and a magnetic strip on inner surfaces of the engagement and side sections; and two straps comprising two hook and loop fasteners at both ends. The engagement sections can be inserted into sides of a tissue box. For each support pivoting the side section to magnetically secure to the engagement section, pivoting the main section to engage the back of the tissue box, looping one end of the strap around a post, securing one hook and loop fastener around the post, inserting the other end of the strap through the slits, and securing the hooks to the loops of the other hook and loop fastener will hang the tissue box.

2 Claims, 14 Drawing Sheets

US 7,870,983 B2

TISSUE BOX HOLDER WITH MAGNETIC AND HOOK AND LOOP ATTACHING ARRANGEMENTS

BACKGROUND OF THE INVENTION

1. Field of Invention

The invention relates to tissue box holders and more particularly to such a tissue box holder for automobile with improved characteristics.

2. Description of Related Art

A conventional tissue (e.g., facial tissue) box 1 is shown in FIG. 14. For automobile application, the tissue box 1 is placed in a holder 2 of similar shape but with a larger size as shown in FIG. 15. The holder 2 is made of a hard material (e.g., metal, ABS plastic, or the like). The tissue box 1 is formed of cardboard. A plurality of tissues are folded and interleaved in the tissue box 1. The tissue box 1 has an oval opening (not numbered) on one of its six surfaces, and a gap 12 on an adjacent surface. The gap 12 is provided to facilitate the replenishment of tissues by opening the surface when the tissues in the tissue box 1 are used up.

The holder 2 is typically placed, for example, in a rectangular recess on a center console in an automobile. In use, a person may remove one tissue which is the partially out of the box 1 by pulling. As a result, another tissue is pulled partially out of the box 1.

However, the well known tissue box holder suffers from a couple of disadvantages. In detail, a person has to use one hand to hold the holder 2 and the other hand to pull a tissue in use because the holder 2 is not stationary. This is not convenient. Thus, the need for providing means to fix the tissue box holder 2 in an automobile application still exists. Moreover, only a tissue box having a size smaller than the holder is adapted to mount therein. In short, the holder is designed to receive a tissue box of the same shape but with a smaller size and thus it is not adaptable.

There have been numerous suggestions in prior patents for tissue box holder. For example, U.S. Pat. Nos. 6,543,737, 6,886,794, and 7,275,656 disclose a tissue box holder.

SUMMARY OF THE INVENTION

It is therefore one object of the invention to provide a tissue box holder having magnetic and hook and loop attaching arrangements.

The above and other objects, features and advantages of the invention will become apparent from the following detailed description taken with the accompanying drawings.

DETAILED DESCRIPTION OF THE INVENTION

Figure 1:
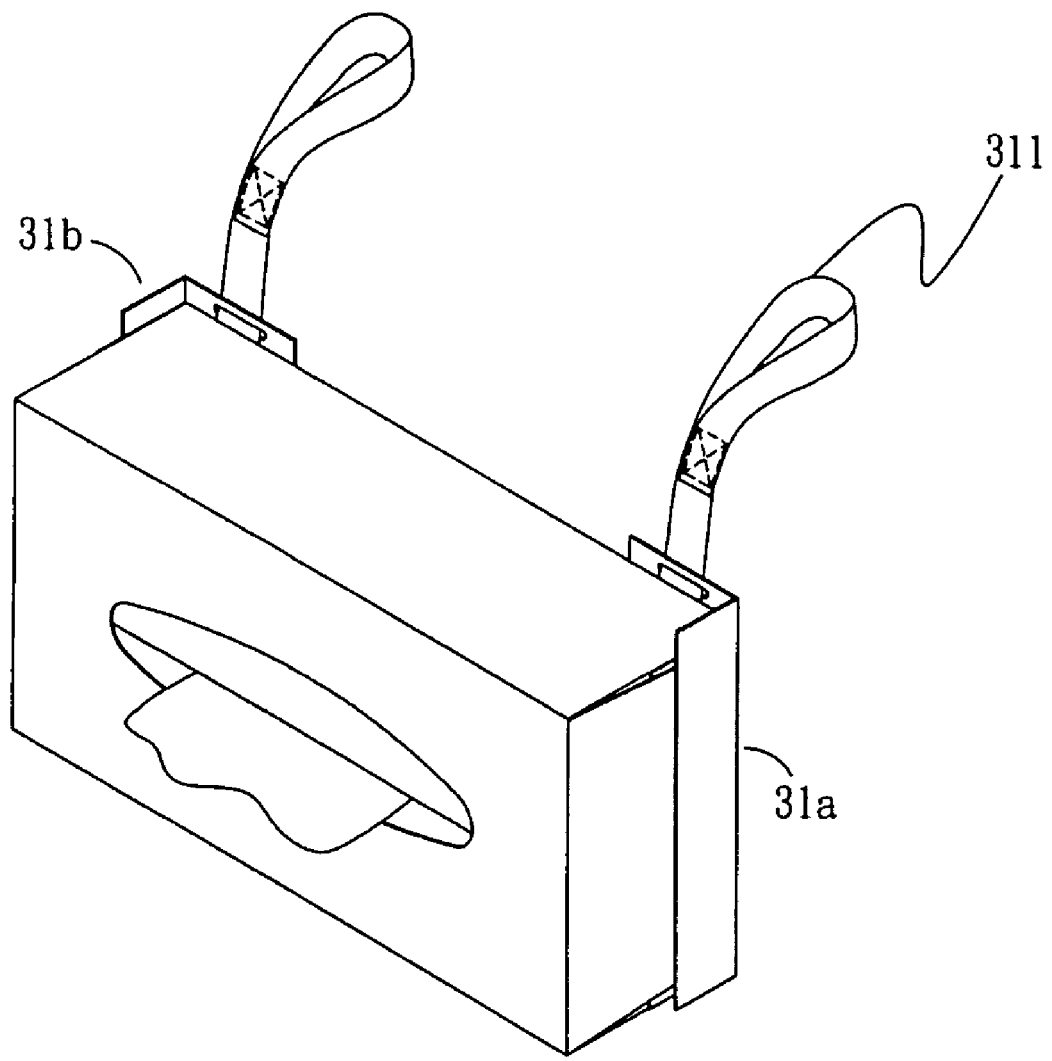
FIG. 1 is a perspective view of a preferred embodiment of tissue box holder according to the invention with a tissue box being fastened in a first arrangement.

Referring to FIGS. 1 to 13, a holder 31 for fastening a tissue box 1 in accordance with a preferred embodiment of the invention comprises first and second supports 31a, 31b and two straps 311. Each component is discussed in detail below.

The tissue box 1 is formed of cardboard. A plurality of tissues are folded and interleaved in the tissue box 1. The tissue box 1 has an oval opening (not numbered) on one of its six surfaces, and a gap 12 on a side surface.

Both the first and second supports 31a, 31b are formed of a hard material (e.g., stainless steel, aluminum alloy or the like). The second support 31b is identical to the first support 31a and hence the following discussion will take the first support 31a as example for purposes of brevity and convenience.

The first support 31a comprises a rectangular main section 316 having a first slit 3161 at one end and a second slit 3162 at the other end; a rectangular side section 315 hingedly secured to one side edge of the main section 316, the side section 315 having a size smaller than that of the main section 316; an engagement section 314 having an arcuate end for ease of inserting into the gap 12; and a magnetic strip 313 adhered to inner surfaces of the engagement section 314 and the side section 315 so that one portion of the magnetic strip 313 on the engagement section 314 is adapted to magnetically secure to the remaining portion thereof on the side section 315 by bending about a tube 317 formed therebetween.

The strap 311 comprises a hook and loop fastener 3111 at either end.

Figure 2:
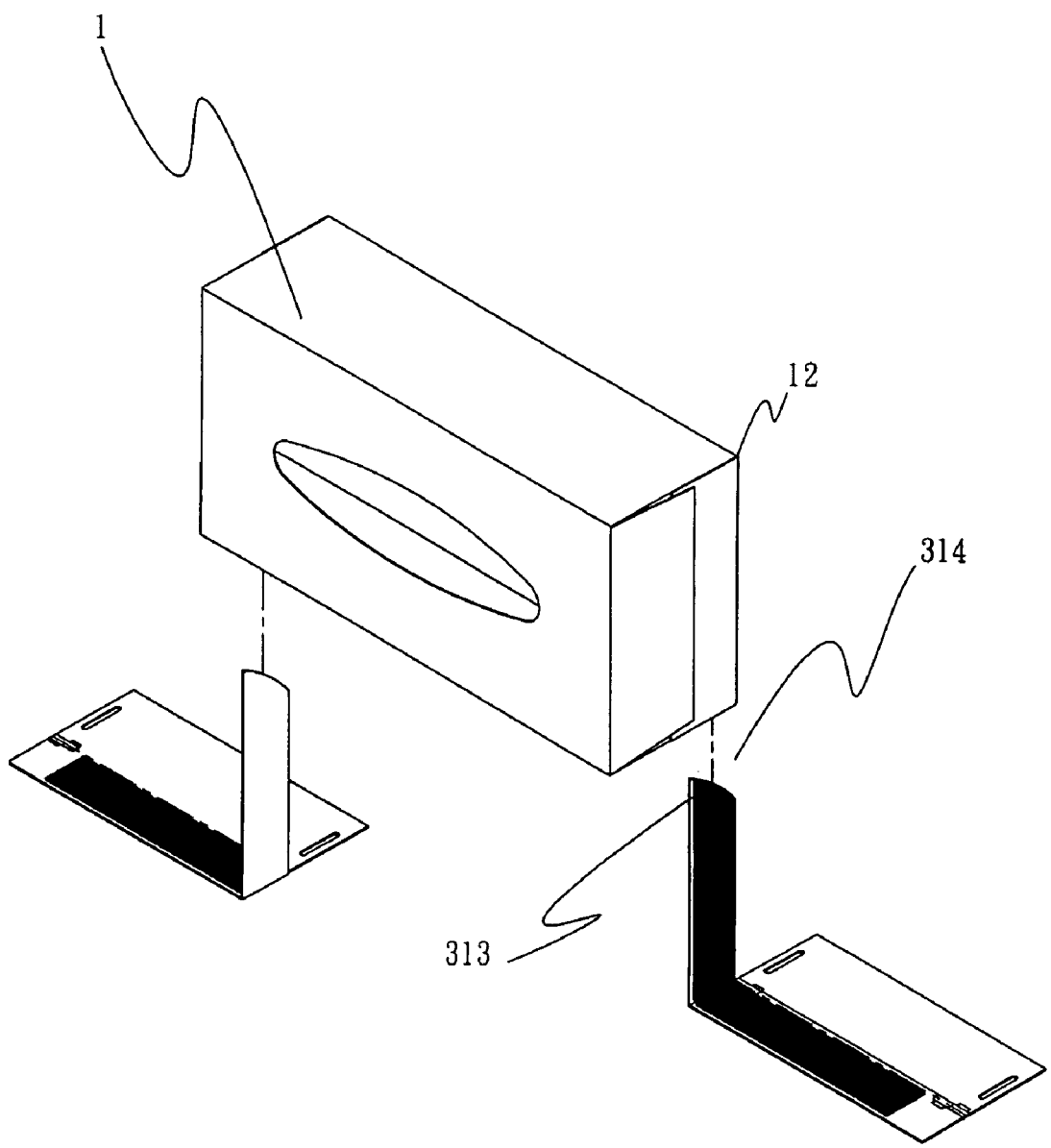
FIG. 2 is an exploded view of the tissue box holder with the straps removed.
Figure 3:
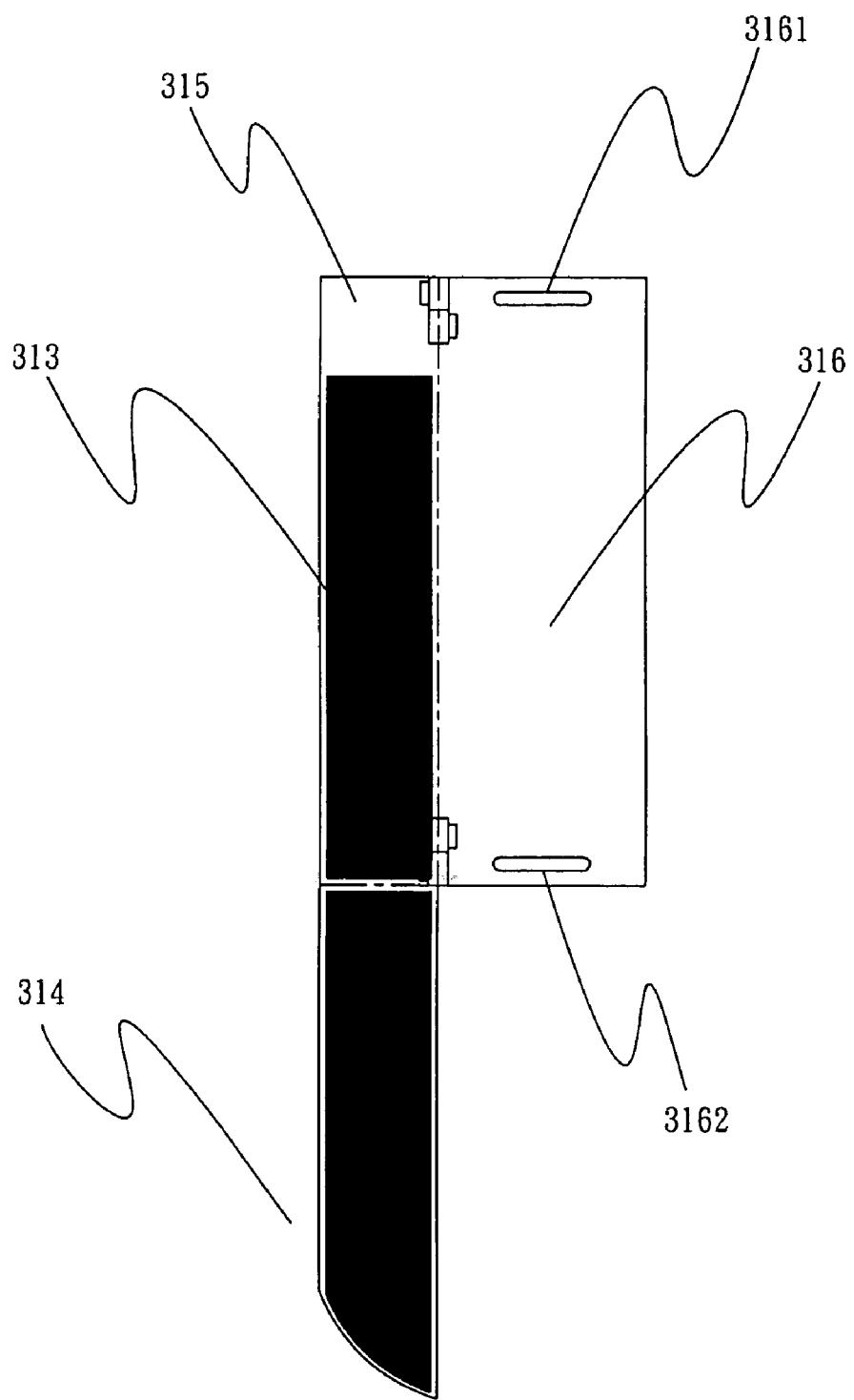
FIG. 3 is a top view of the support in an extended state.
Figure 4:
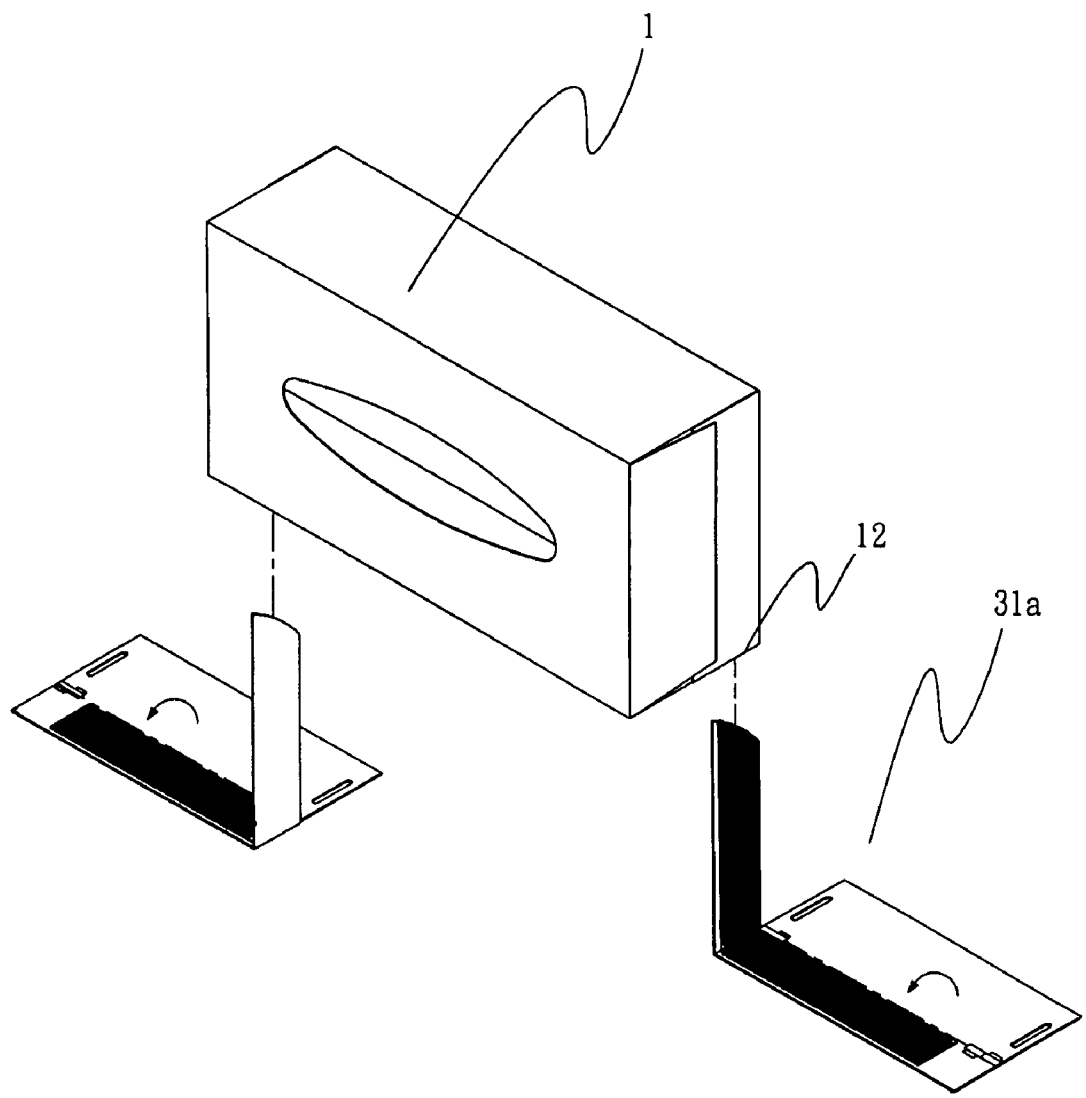
FIG. 4 is a view similar to FIG. 2 showing the hinge mechanism of the support.
Figure 6:
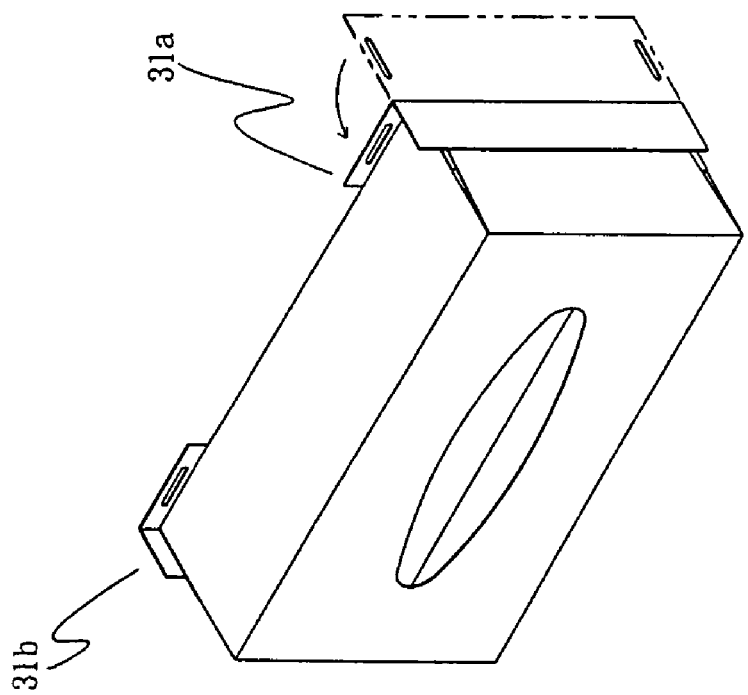
FIGS. 5 and 6 are perspective views showing the steps of securing the supports to the tissue box.
Figure 5:
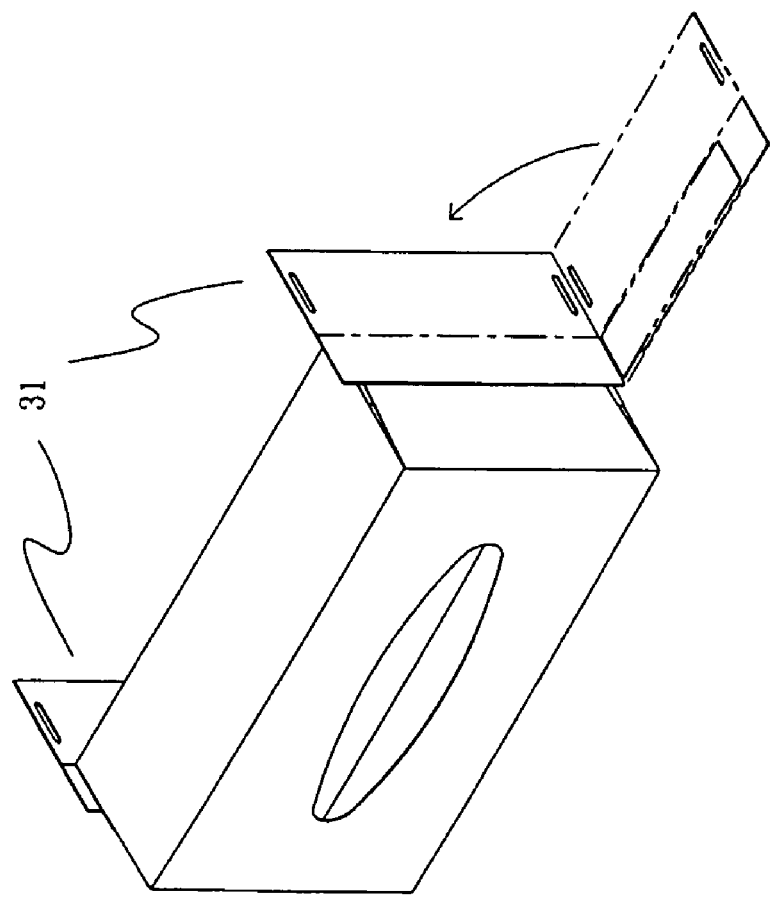

In installation, insert the arcuate end of the engagement section 314 into the gap 12 (see FIGS. 2 and 5). Next, lift both the main section 316 and the side section 315 by pivoting about the tube 317 until one portion of the magnetic strip 313 on the side section 315 is magnetically secured to the remaining portion thereof on the engagement section 314. Next, pivoting the main section 316 about the hinges until the main section 316 is engaged with the back of the tissue box 1 (see FIG. 6). The support 31a is thus shaped as an L.

The invention finds an application in automobile as described below. But the invention is also applicable in other applications not discussed herein.

Figure 7:
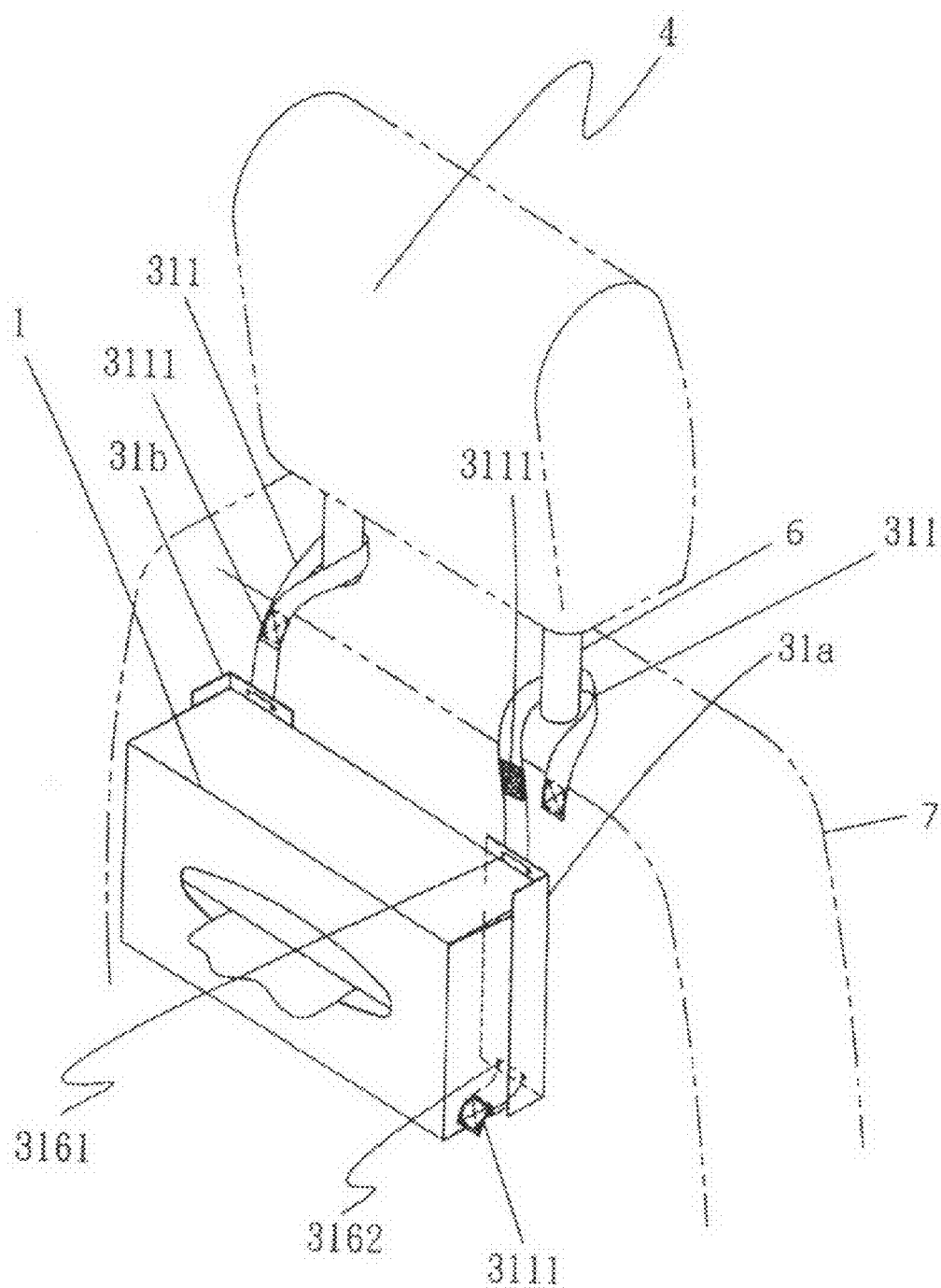
FIG. 7 is a perspective view showing the tissue box holder being secured to the back of backrest of a seat of an automobile in one configuration.

As shown in FIGS. 1 and 7, after securing the supports 31a, 31b to the tissue box 1, one end of either strap 311 is looped around either post 6 interconnecting a headrest 4 and a vehicle seat 7. One hook and loop fastener 3111 at one end of the strap 311 is then secured together around the post 6 by attaching its hooks to its loops. Insert the other end of the strap 311 through the first slit 3161 and the second slit 3162 and then attach the hooks of the other hook and loop fastener 3111 at the other end of the strap 311 to the loops of the other hook and loop fastener 3111. As an end, the tissue box 1 is held in a hanging state for being ready to use.

Figure 8:
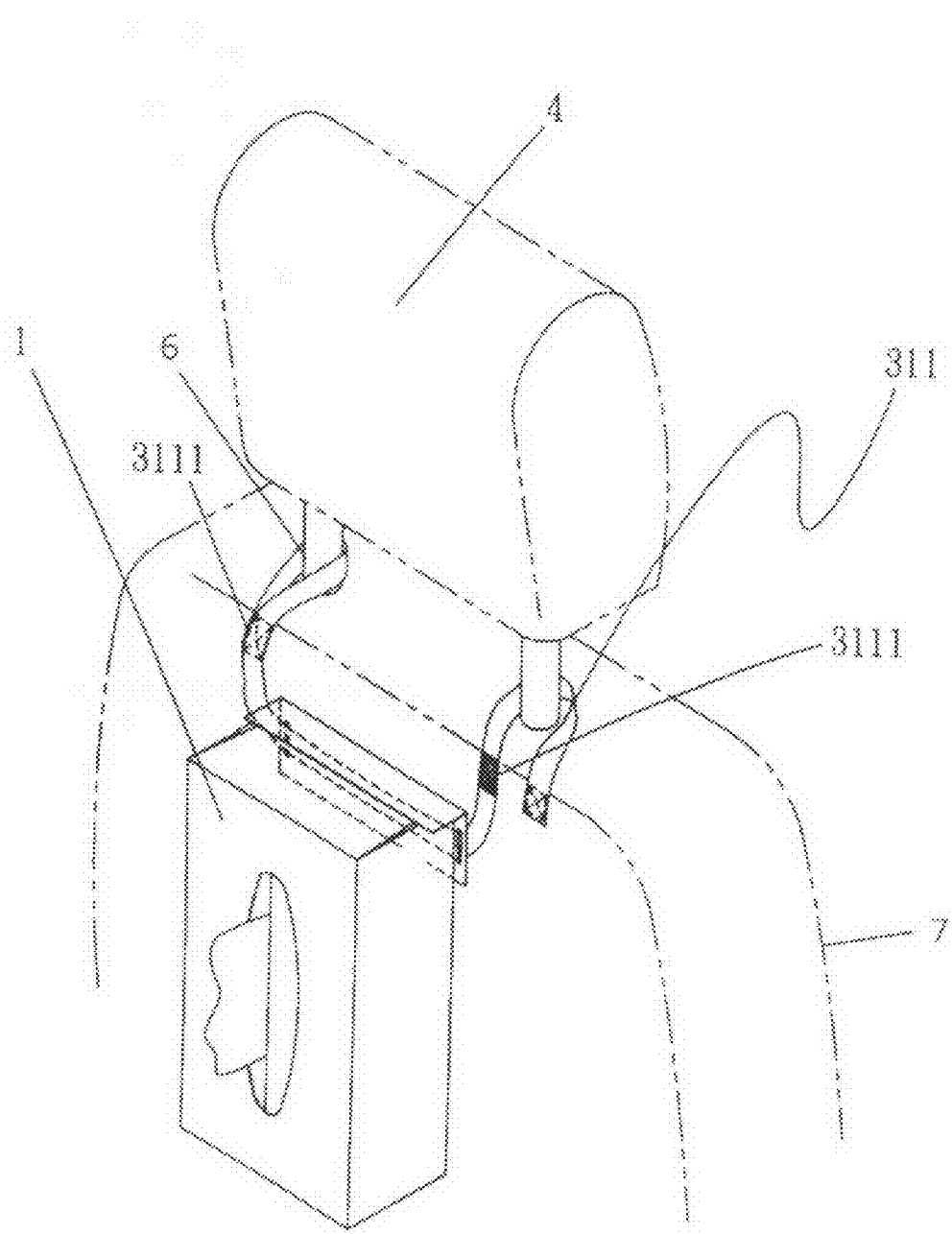
FIG. 8 is a view similar to FIG. 7 showing the tissue box holder being secured in another configuration.

As shown in FIG. 8, after securing either support such as the support 31a to the tissue box 1, one end of the strap 311 is looped around either post. One hook and loop fastener 3111 at one end of the strap 311 is then secured around the post 6 by attaching its hooks to its loops. The other end of the strap 311 inserts through the first slit 3161 and the second slit 3162 and loops around the other post 6 prior to attaching the hooks of the other hook and loop fastener 3111 at the other end of the strap 311 to the loops of the other hook and loop fastener 3111. As an end, the tissue box 1 is held in a hanging state for being ready to use. Only one support and one strap are employed in this configuration.

Figure 9:
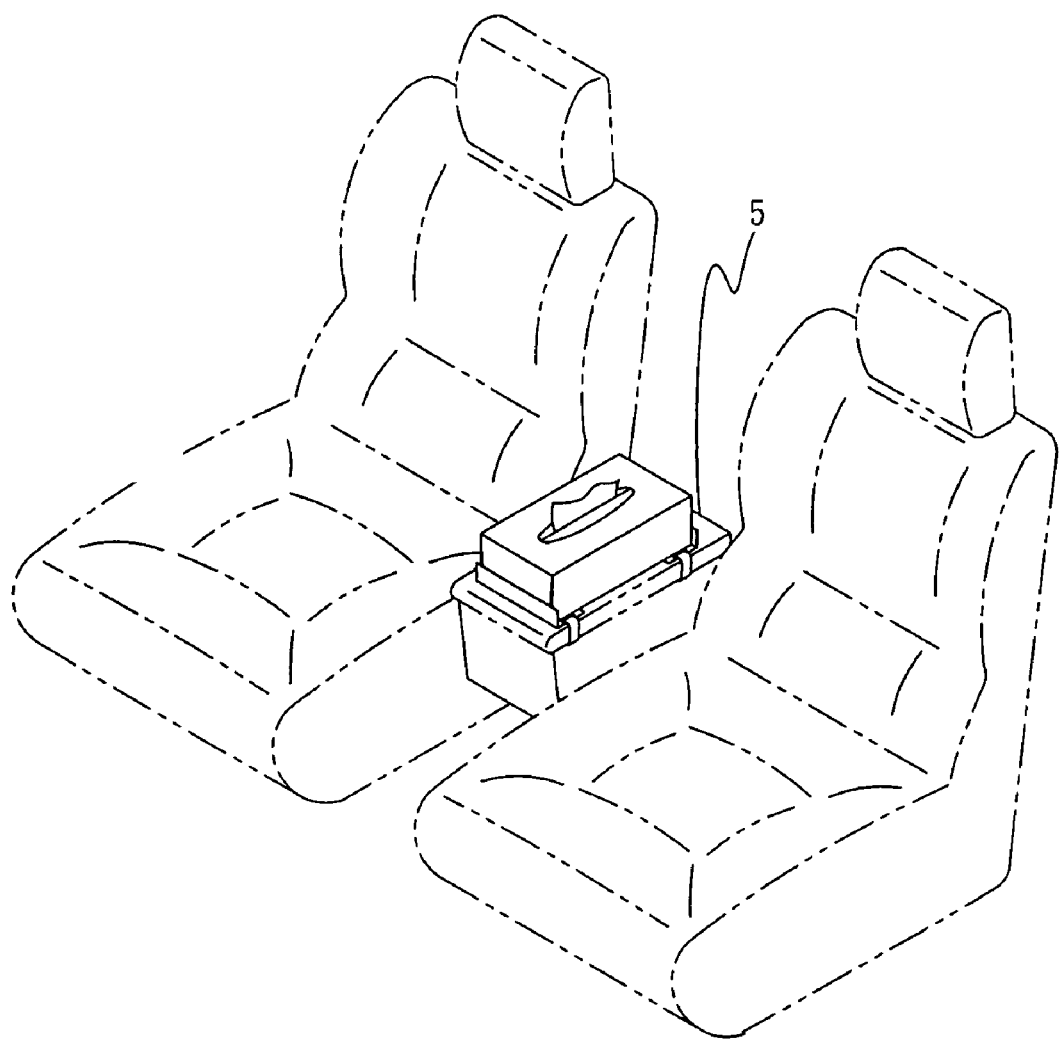
FIG. 9 is a perspective view showing the tissue box holder being secured onto a center console between two seats of an automobile in still another configuration.
Figure 10:
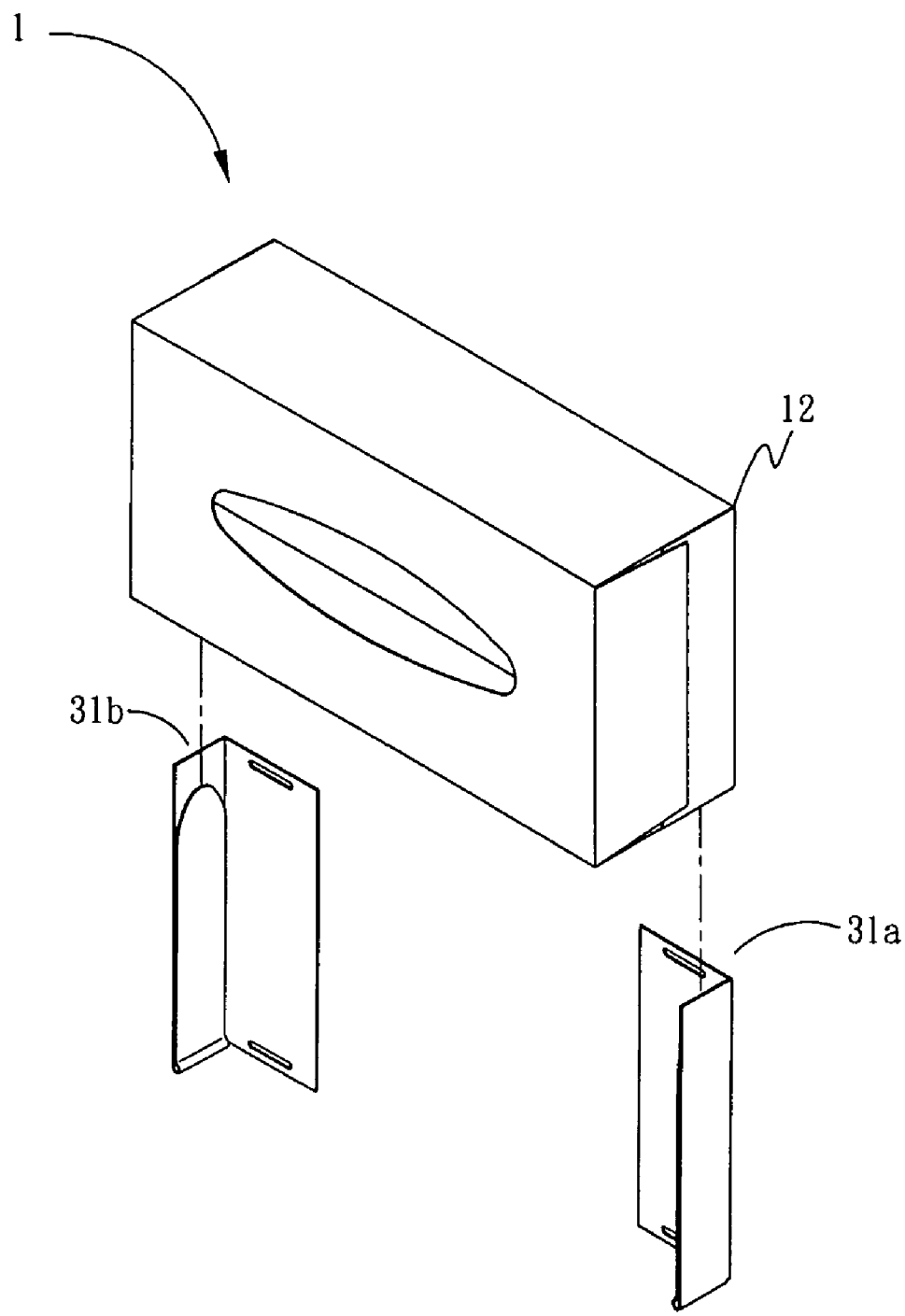
FIG. 10 is a perspective view showing the supports to be secured to the tissue box.
Figure 11A:
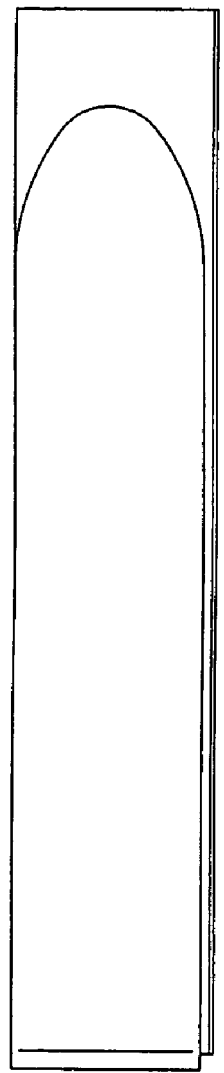
FIGS. 11A and 11B are side elevations of the engagement section being lifted to engage with the side section by pivoting about a tube therebetween.
Figure 11B:
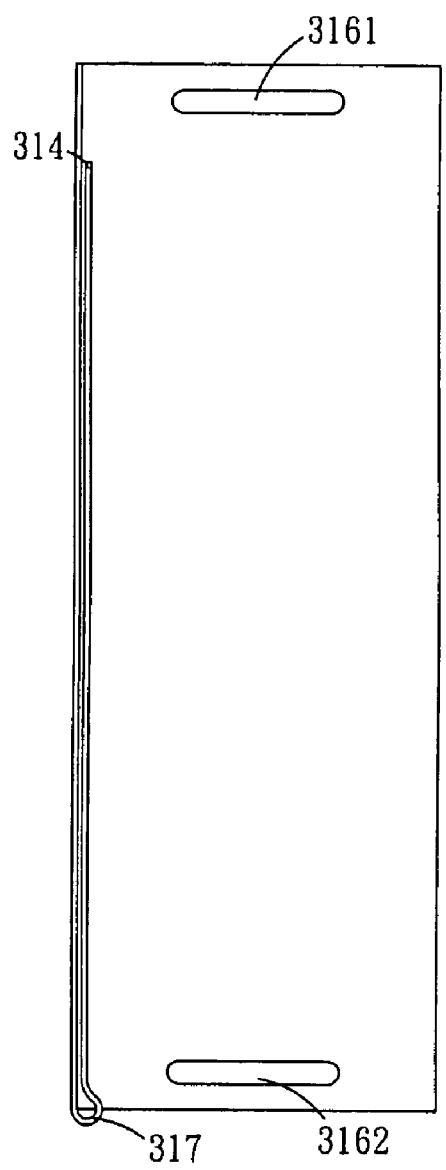
Figure 12:
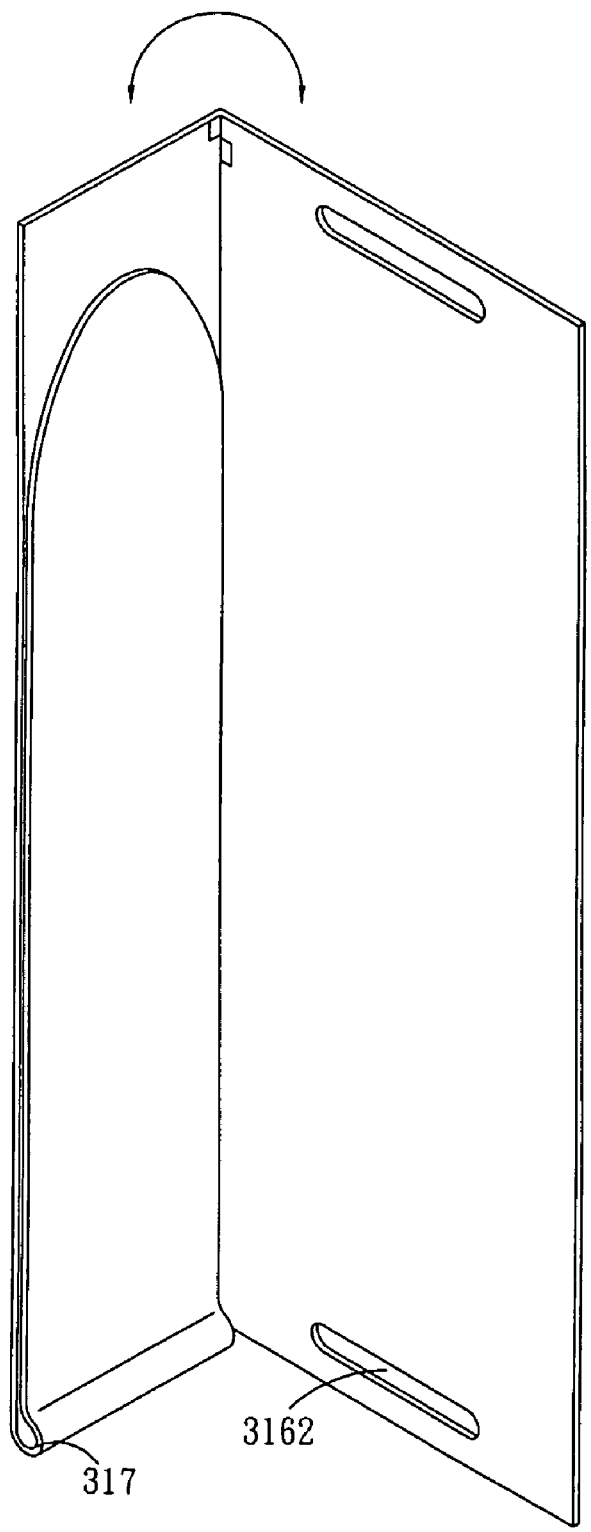
FIG. 12 is a perspective view of FIG. 11 showing the hinge mechanism of the support.

As shown in FIG. 9, after securing the supports 31a, 31b to the tissue box 1, insert one end of the strap 311 through the first slit 3161 and the second slit 3162 and then attach one hook and loop fastener 3111 to one surface of a center console 5 between two seats. Next, attach the other hook and loop fastener 3111 to one surface of the center console 5. As an end, the tissue box 1 is held in a stationary state for being ready to use.

Figure 13:
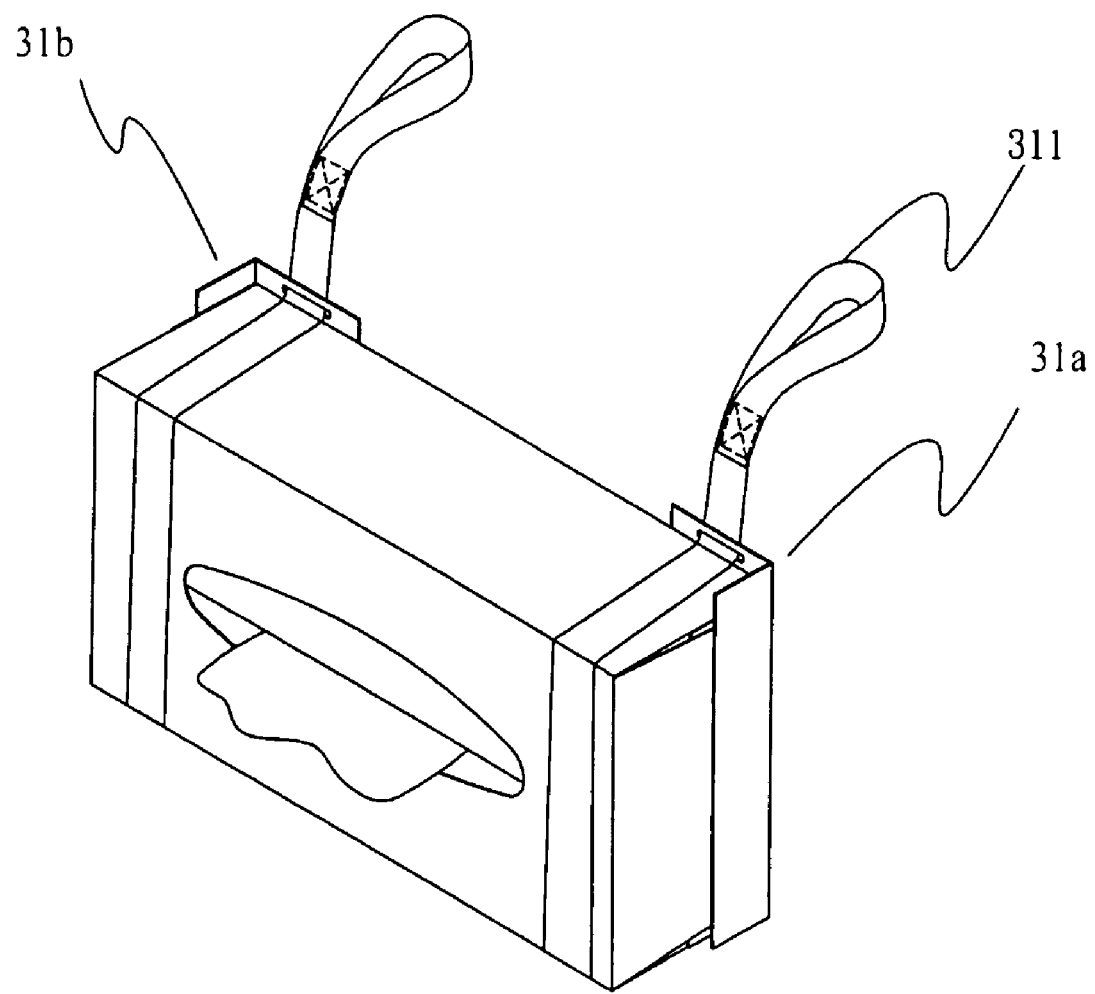
FIG. 13 is a perspective view of the tissue box holder with a tissue box being fastened in a second arrangement.
Figure 14:
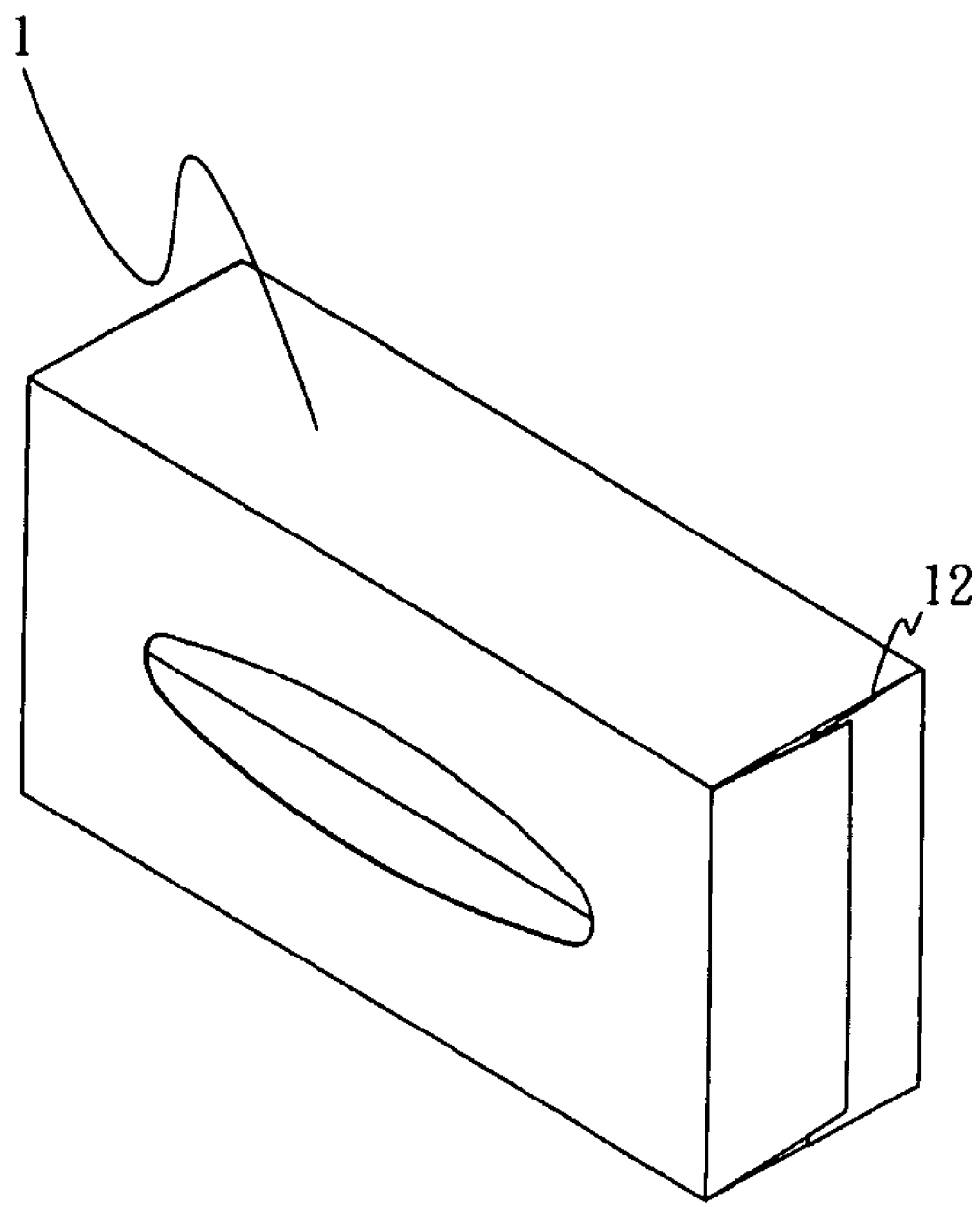
FIG. 14 is a perspective view of a conventional tissue box.
Figure 15:
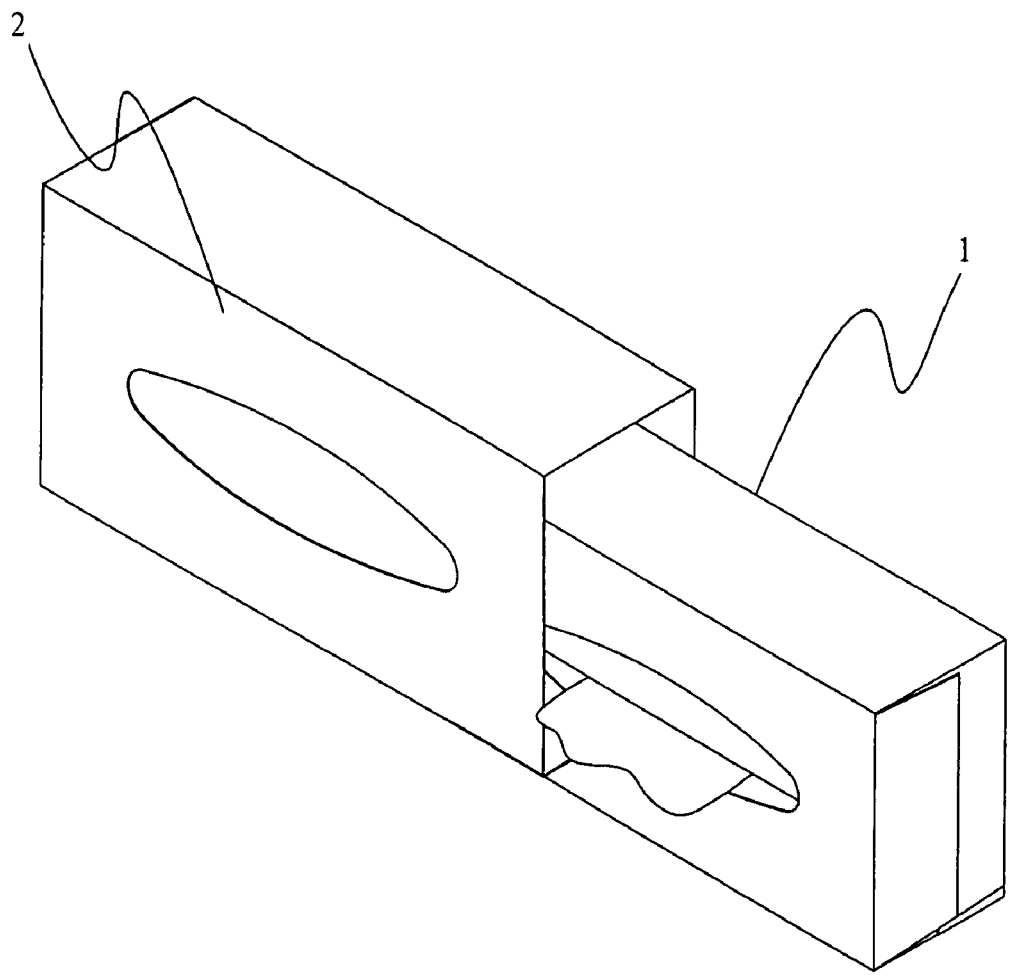
FIG. 15 is a perspective view of a conventional tissue box holder with the tissue box of FIG. 14 being partially disposed therein for use.

As shown in FIG. 13, another configuration of the fastening shown in FIGS. 1 and 7 is illustrated. The characteristic of this configuration is that after inserting through the first slit 3161 the strap 311 tightly loops around the tissue box 1 prior to inserting through the second slit 3162 thereof.

It is also contemplated by the invention that screws can be employed to drive through the slits 3161, 3162 to secure the holder 31 to the wall or the underside of a desk as an alternative installation method.

It is further contemplated by the invention that adhesives can be employed to secure the holder 31 to the wall or the underside of a desk as another alternative installation method.

While the invention herein disclosed has been described by means of specific embodiments, numerous modifications and variations could be made thereto by those skilled in the art without departing from the scope and spirit of the invention set forth in the claims.

What is claimed is:

1. A tissue box holder comprising:
a support comprising a rectangular main section having a first slit at one end and a second slit at the other end, a rectangular side section hingedly secured to the main section, an engagement section pivotably secured to the side section, and a magnetic strip on inner surfaces of the engagement section and the side section; and
a strap comprising a hook and loop fastener at either end;
wherein the engagement section is adapted to be inserted into a back of a tissue box such that the side section can be pivoted so as to adhere the magnetic strips of the side section and the engagement section and such that the main section can be pivoted so as to engage the back of the tissue box, wherein the strap is adapted to be attached to the support via the slits, and wherein the strap is adapted to be looped around a headrest post of a vehicle seat and held in place using the hook and loop fasteners in order to hang the tissue box from the vehicle seat.

2. A tissue box holder comprising:
two supports each comprising a rectangular main section having a first slit at one end and a second slit at the other end, a rectangular side section hingedly secured to the main section, an engagement section pivotably secured to the side section, and a magnetic strip on inner surfaces of the engagement section and the side section; and
two straps each comprising a hook and loop fastener at either end;
wherein the engagement sections of both supports are adapted to be inserted into respective sides of a tissue box such that each support's side section can be pivoted so as to adhere the magnetic strips of that support's side section and engagement section and such that each support's main section can be pivoted so as to engage a back of the tissue box, wherein each strap is adapted to be attached to a respective support via that support's slits, and wherein each strap is adapted to be looped around a headrest post of a vehicle seat and held in place using the hook and loop fasteners in order to hang the tissue box from the vehicle seat.

\* \* \* \* \*